RESETTABLE FIXED DELAY COMMERCIAL SQUELCH CIRCUIT

Filed Sept. 5, 1967

INVENTOR.
JOHN F. MARCHAND
BY Robert [signature]
ATTORNEY

INVENTOR.
JOHN F. MARCHAND
BY
Robert Binnesthorpe
ATTORNEY

INVENTOR.
JOHN F. MARCHAND
BY Robert [signature]
ATTORNEY

INVENTOR.
JOHN F. MARCHAND
BY Robert Ames Norton
ATTORNEY

INVENTOR.
JOHN F. MARCHAND
BY Robert Ames Norton
ATTORNEY

INVENTOR.
JOHN F. MARCHAND
BY Robert Lune Smith
ATTORNEY 3,424,865

RESETTABLE FIXED DELAY COMMERCIAL SQUELCH CIRCUIT

John F. Marchand, 445 E. 65th St., New York, N.Y. 10021

Continuation-in-part of application Ser. No. 338,235, Jan. 16, 1964. This application Sept. 5, 1967, Ser. No. 675,265
U.S. Cl. 178—5.8 11 Claims
Int. Cl. H04n 5/60

ABSTRACT OF THE DISCLOSURE

Timed sound muting for television or radio receivers is provided by a switch assembly that is momentarily actuated by the listener, for example by a switching system with a remote control using radiant energy. The starting switch starts a time delay mechanism, preferably through locking relay elements, and this time delay maintains the muting action for a predetermined period of time, then restores the sound and resets the mechanism. The disclosure includes muting devices of this type that can be installed or attached without any internal rewiring of the television set or the radio receiver.

CROSS REFERENCES TO RELATED APPLICATIONS

This application is a continuation-in-part of an earlier application 338,235, filed Jan. 16, 1964, and now abandoned.

BACKGROUND OF THE INVENTION

Radio and television broadcasting, particularly in the United States, is accompanied by what, to many listeners is a necessary evil. The broadcasting is supported by advertising in the form of many announcements or commercials advertising the sponsors' wares. Interruption of the program at long intervals for station identification is a legal requirement and a break that is ordinarily considered unobjectionable, as these announcements are very short and never in bad taste. At the same time to many people frequent commercials are an irritant, and in some cases the announcements are also of such a nature that parents do not wish their children to be exposed to them. Usually, however, commercials are merely boring as to subject matter and thus an annoyance to some listeners and viewers.

Several methods or devices have been proposed to eliminate those commercials which the listener or viewer does not wish to hear. One example of a simple device for this purpose is a manual switch which cuts off the sound and which may be located for remote control. The switch is 100% effective, but it requires manual operation for starting and stopping. When it is used, this on and off type of switch requires attention on the part of a listener who may want to use the time of commercials for other purposes, and in the case of radio this shutting off of the sound gives no indication to the listener as to when the commercial announcement is over. Therefore, while the simple on and off types of manual switches have achieved some limited success they leave much to be desired.

It has been proposed to provide electrical filters or relays which are actuated by the different nature of electrical impulses from voice and from music. However, these devices have not achieved any significant success because they cannot distinguish between the unwanted voice on undesired commercials and other voice broadcasts which are wanted, for example newscasts or certain commercials which the listener or viewer wishes to hear. As a result of such difficulties there has been no generally satisfactory device for selectively editing program material or for the elimination of undesired commercials.

It has also been proposed to redesign a radio receiver muting device for automobile use by running wires down to a foot switch, which, when actuated alters the bias of a tube in the audio system in order to cut off the audio output. This output then remains off until the expiration of a time delay controlled by a resistor capacitor network, or by pneumatic means. This tube bias change requires a redesign of the receiver, and it does not include reliable mechanical latching means. Also, it makes it necessary for someone with appropriate skill to run wires into the receiver. Furthermore it does not permit an actuation of the muting effect by devices that are not physically connected to the receiver, or by devices that can be attached to the receiver mechanically wihout any change in the wiring arrangement or other essential elements of the receiver itself.

SUMMARY OF THE INVENTION

The present invention includes a starting switch that is manually operated but preferably acts through one of the conventional remote control transmissions, such as radiation, whether of the ultrasonic, radio frequency, or coded audio frequency, type in a code that cannot be found in program material. Preferably a positive latching action by a locking relay is provided. After an actuation of the starting switch the latching mechanism starts a time delay element so that the muting switch remains locked in for a predetermined period of time, after which it automatically resets the system in readiness for another actuation. During the actuation of this delay element the sound output is either cut off altogether or is so well muted so that the commercial announcement is not objectionable.

Furthermore, this invention can cut in, through a relay, a substitute signal in place of the commercial, for example a more attractive sound output such as that from a music box or a tape deck.

During the remainder of this specification the starting switch for the squelch circuit will be referred to as the "squelch switch" or "squelch button."

The useful locking feature in this audio muting device is made possible in one of two preferred ways: the first way being by locking relays for the time mechanisms and the second by a two-position squelch switch so arranged that, on resetting, an actuation of the squelch switch from the second position to the first position by the listener will initiate a subsequent squelch cycle. In each case there is a reliable positive locking mechanism.

A major advantage of the locking relay is that it can be unlocked electrically, or mechanically, by a stop squelch button if the listener wishes to restore the audio output before the time cycle for the squelch has ended automatically. For example, this stop squelch action is by momentarily opening a normally closed switch in the line that keeps an electrically latched relay in the latched position. Thus the squelch can be ended at any moment one wants to restore the audio output.

It is possible and usually easy to connect the squelch switch and time delay mechanism into the sound system of the receiver, as by cutting off connections to the voice coil of the loudspeaker or at some point along the leads thereto, or by muting by connecting more or less of a short circuit across the voice coil. However, persons who are not mechanically inclined are fearful of making mistakes and prefer not to try this. There are also some cases, such as those of receivers with an output transistor directly feeding a speaker voice coil or those with high fidelity systems using multiple speakers for different frequencies, in which it may not be as feasible merely to make the wiring connections for a squelch circuit directly. For example, the load on an output transformer during the squelch cycle may in some instances be unsuitable for the transistor characteristics, in which case the present invention may be used to cut off connection to a transistor base or power supply.

There are instances in which a set owner may wish to connect this invention within the circuitry of the receiver even if it is not essential that he do so in order to use it. For example he can use it in providing for a short circuit of the volume control rheostat to squelch the audio output. In the case of multiple speakers for different frequencies it is feasible thus to connect the present invention to the volume control circuit or into the primary circuit of the output transformer, or even in some cases the grid circuit of the output vacuum tube or driver tube where a push-pull output is used. Ordinarily in such cases the installation must be made by a technician or some other person having an elementary knowledge of audio output circuits. When the present invention is connected into the voice coil leads, it may be so connected in the form of a shunting switch which shorts the voice coil, or one of the leads to the voice coil may be cut and the present invention introduced as a series switch so that the connection to the voice coil is interrupted during the squelch cycle. For many receivers the way to connect is a matter of choice, and here the shunting modification is often so simple that it may be connected in by a receiver owner himself with little difficulty if he uses a soldering iron or mouse tooth clamps the teeth of which will bite through wire insulation. When this shunting modification is used there will sometimes not be a complete removal of sound, but instead a marked reduction in sound to a level that is low enough, to eliminate the annoyance of unwanted commercials.

Since the present invention is not intended to be limited to use with any particular receiver design, the specific description in connection with the drawings will be in the form of a diagrammatic voice coil and speaker, except in the case of one modification involving a transistor output without an output transformer.

In a majority of cases it is most desirable to bring about the squelching effect of the present invention without any electrical interference within the receiver units itself, and for this mechanical control purpose my externally attached devices, which have no electrical connection with the receiver, are preferred. The advantage of these is that they can be installed by the average listener or home handyman even if he has no practical knowledge of radio electronic hardware or of radio receiver wiring systems. Such devices are thus the most convenient of all in many instances and they constitute a preferred form of the present invention.

This preferred modification of the invention may operate in a very simple way by cutting off the power supply to the receiver during the locked time delay interval, in this form it provides a modification that is practical and convenient with receivers that are designed to start immediately because they contain only transistors. Where electronic tubes are involved and there is the problem of a relatively long warm-up or tubes that should not be turned off too often, it is possible to reduce the voltage of the power supply to these tubes to a level where a commercial is heavily muted without removing all power from tube heaters. For example a reduction in line voltage supply from 115 to 60 or 70 volts has served this purpose with a typical television receiver unit.

Another form of the preferred embodiment is primarily useful with receiver that include electronic tubes, such as for example, a majority of the older television receivers still in use. Here the muting effect is brought about by an anticlockwise mechanical movement of the volume control shaft of the receiver itself. The mechanical connection for this purpose is part of the present invention and it is so designed that it does not require any change within the receiver and does not call for any electrical knowledge on the part of the listener who installs it.

The power supply for the present invention will normally be from ordinary 115 volt AC or DC power outlets.

However, for transistor radios and certain others a portable power supply which is taken from the receiver itself one that is compatible in voltage is used. Furthermore, with properly selected relay coils, the power supply can also be contained within the housing of the invention itself as a disposable or rechargeable battery for a convenient arrangement that is well suited for easy attachment to a small radio unit. Thus the present invention is not limited to any particular type of power supply except in connection with some modifications using an AC driven electric clock or other AC delay mechanisms.

This versatility in power supply utilization for various modifications of the present invention is one of the practical advantages.

When a 115 volt supply is used it is a simple matter to provide a pilot light assembly such as neon glow tubes which light up or show letters when the squelch cycle is in operation. This inclusion of a pilot light is a refinement which is not necessary to the basic operation of the present invention, but it is a feature which is added in as a convenience. In the case of supply voltages for which neon light are not well suited, a different type of light may be used or a relay may be employed to provide for the pilot light. In general, a pilot light is most practical where the power supply voltages are such that a simple neon glow tube may be used.

BRIEF DESCRIPTION OF THE DRAWINGS

FIGS. 1 to 7 illustrate various modifications in which there is an actual electrical connection in or across an element of the audio system such as a voice coil.

FIG. 3 illustrates the operation of a squelch button by a remote control receiver which is actuated by the listener through radiant energy, such as a radio frequency, ultrasonic or coded audio signal. This is a preferred way of actuating the squelch button as it does not require the listener to approach the receiver or to actuate the squelch cycle through an untidy festoon of long wires leading to the receiver. However, once the squelch button has been actuated by one means or another, the other operations of the invention proceed regardless of how this button was actuated. Thus for simplicity in illustration FIGS. 1, 2 and 4 to 7 show only the squelch button without the preferred remote, radiant energy control thereof.

Figure 3:
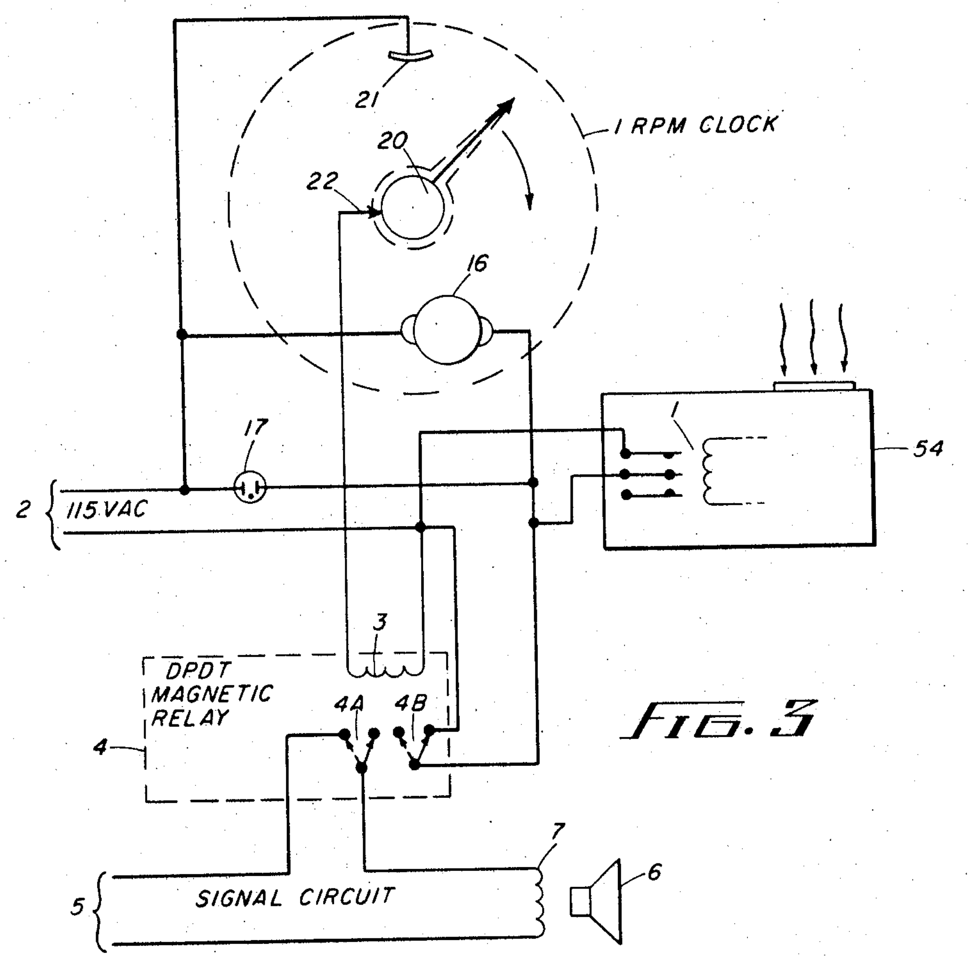
FIG. 3 is a schematic of a similar modification using another standard electric clock mechanism.
Figure 4:
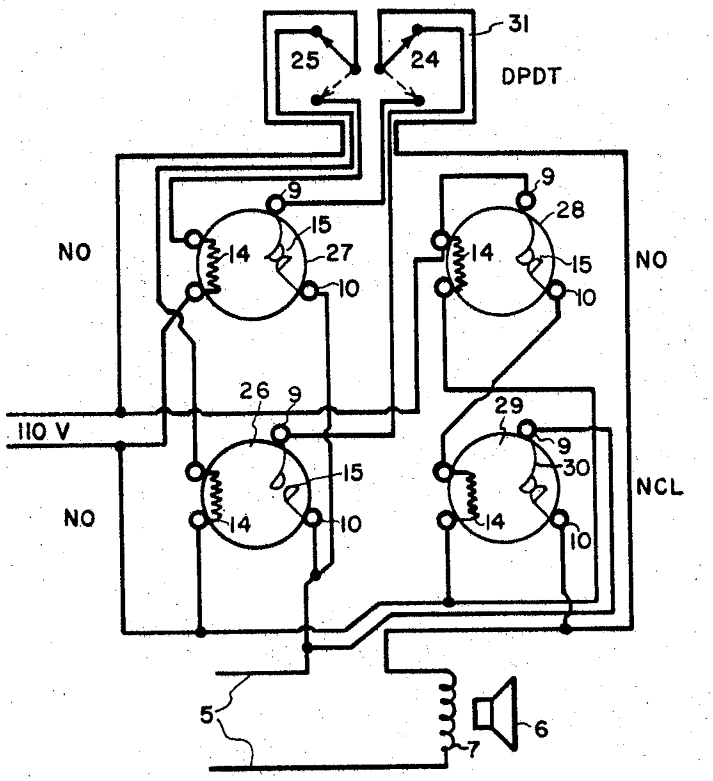
FIG. 4 is a schematic of a mechanism using only thermal delay relays.

In all of the first seven figures the squelch button or switch is shown at 1 except in FIG. 4, where a different form of squelch switch is described. Also, in FIGS. 1 to 7, which illustrate modifications in which there is actual electrical change in the audio output of the receiver, this is shown diagrammatically as an audio output 5 comprising a speaker 6 and a voice coil 7. In all of the FIGURES 1 to 6 the power is shown at 2 as being a 110 volt AC line FIG. 7 utilizes a different form of power which is more suitable for transistor operation.

Figure 1:
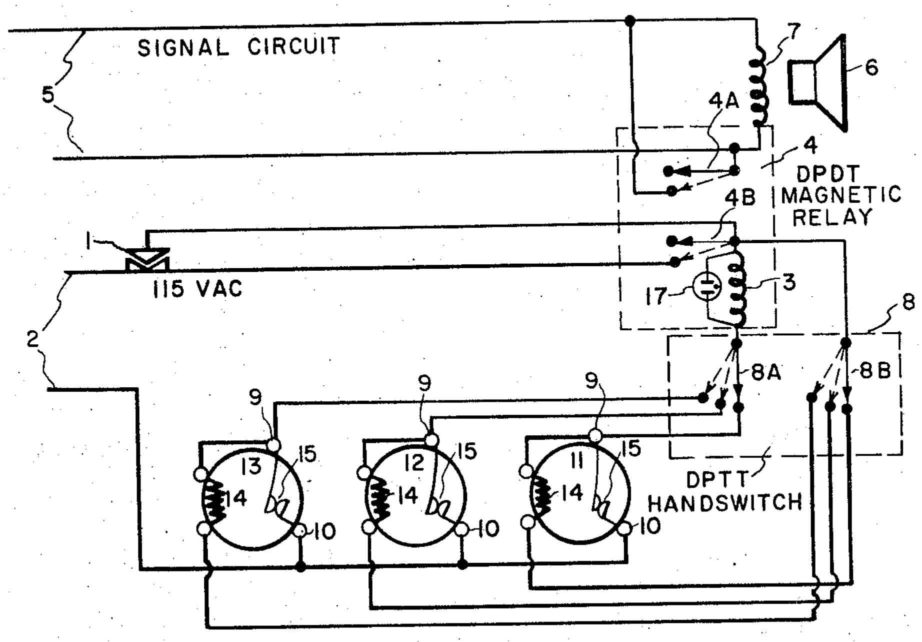
FIG. 1 is a schematic of a magnetic relay and thermal delay relay modification.

Referring to FIG. 1, when the listener desires to initiate a squelch cycle, the squelch switch 1 is momentarily closed, either by hand or preferably, through radiant energy actuated remote control, as is shown in FIG. 3. When directly actuated, the squelch switch 1 may be on the receiver itself or it may be at the end of a pair of extension wires so that the listener may actuate it directly by hand from a distant position.

In FIG. 1 the squelch button activates a DPDT magnetic relay 4 provided with blades 4A and 4B. The switch 1 connects one side of the power line to blade 4B and one end of the relay coil 3. The other end of the relay coil 3 is selectively connected by the DPTT switch 8 having blades 8A and 8B. Blade 4B and hence one end of the coil 3 is connected to blade 8B where the other end of the coil is connected to blade 8A. The three switch points in switch 8 for blade 8A connect to one load terminal 9 of thermal delay relays 11, 12 and 13 respectively. These relays are of a normally closed type and the other load terminals 10 are connected to the other side of the power line. Connections 9 in each case are connected to one end of heater 14 of the relays, the other end being connected to the various contact points of blade 8B. It will be seen that the setting of switch 8 connects one of the three thermal delay relays into the circuit. These relays have different time delays, for example 30 seconds, one minute, and three minutes.

The squelch switch 1 is shown at the position connecting thermal delay 11 into the circuit. The other positions are shown conventionally by dotted lines. When the switch 1 is momentarily closed current flows through the coil 3 blade 8A, load terminal 9, movable delay contacts 15 and load terminal 10, all of thermal delay 11, back to the line. The current flowing through the coil 3 serves to throw the switch 4, blade 4B being switched directly into contact with the line and so locking the magnetic relay whereas blade 4A moves to the contact shown by the dotted lines in which it short circuits the voice coil 7 of of the speaker. Accordingly, sound ceases. At the same time current flows through blade 4B to heater 14 of the thermal delay 11 and the heater begins to heat. After the predetermined delay time, let us say 30 seconds for this tube, the contacts 15 open. This breaks connection to the other side of the line 2, current ceases to flow through the coil 3 and the magnetic relay 4 returns to its initial position opening up the position of the switch at 4A so that sound once more comes out of the speaker. At the same time 4B is moved to its original position which cuts off power from 8B and hence from the heater 14. The heater rapidly cools off and the device is ready to initiate another cycle after a very short pause required for the heater to cool off. A neon tube 17 is shown across the coil 3 of the relay 4 and it glows while the squelch cycle is in operation. As has been pointed out above, the glow light or pilot light does not affect the operation of the squelch cycle in the slightest. It merely gives a visual indication that the cycle is in operation. Although not necessary basically to the invention, this signal lighting arrangement is an advantage because someone hearing no sound knows that this silence is due to a squelch circuit in operation and not to some wrong setting or other malfunction of the receiver itself.

FIG. 1 represents a simple and cheap modification of the present invention and it of course may be used with only a single delay tube, in which case the switch 8 becomes unnecessary.

Figure 2:
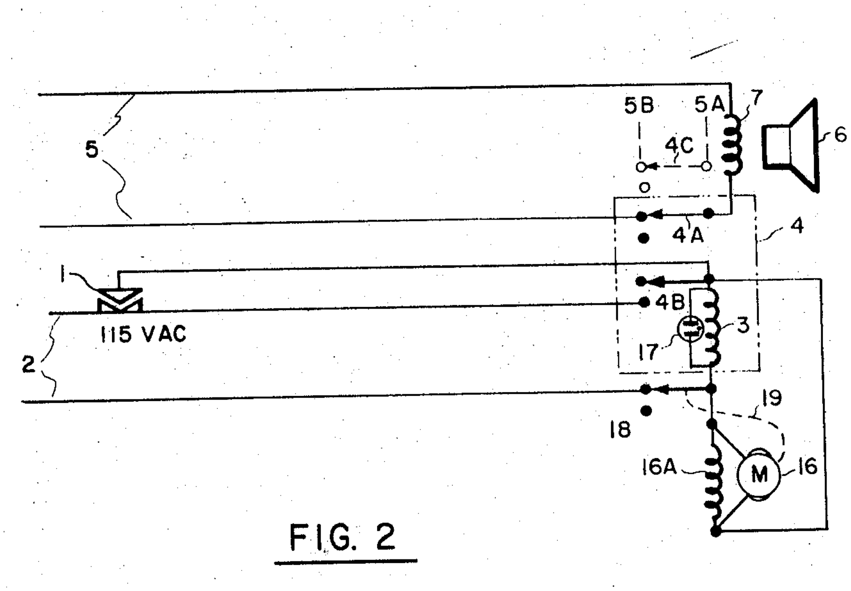
FIG. 2 is a schematic of the modification using an electric clock timer type switch.

FIG. 2 is basically similar to FIG. 1. The power line 2, squelch switch 1 and magnetic relay 4 being identical, the same elements of course carry the same reference numerals. The relay switch blade 4A however is shown as connected in series with instead of shunting the voice coil. Instead of thermal delay relays a clock switch mechanism 16 with clutch coil 16A is started. It should be noted that a locking effect on coil 3 of the magnetic relay is effected by blade 4B which connects to one side of the power line 2. The clock timer 16 is of conventional design and when it moves through a time which has been preselected it operates a switch 18 through the clutch and a mechanical linkage 19. As the time piece is of conventional design its details are not shown. As soon as the switch 18 is opened one side of the line is cut off, the clock switch stops and resets itself in conventional manner, the magnetic relay 4 also releases and sound is then obtained from the speaker 6.

As shown in FIG. 2 where the signal circuit to the speaker voice coil is broken by actuation of the squelch switch, rather than shunted, there is a possibility also of squelching the video output in the case of a television receiver. This is shown optionally in dashed lines by a third switch arm 4C a circuit through wires 5A and 5B to the video output of the television receiver. Such video squelching is normally less desirable than simply squelching the sound. For some viewers, however, the picture of the commercial is also objectionable and in this case therefore the video can also be cut off by the incorporation of the third switch arm in the magnetic relay. If it is desired to combine video cut off with audio cut off by the shunt method the contacts for switch arm 4A can be reversed. The video cut off can be provided in FIG. 1 as in FIG. 2 because the only essential difference between FIG. 1 and FIG. 2 is in the nature of the time delay mechanism itself, an element which does not alter the operation of the magnetic relay 4 but only alters the arrangement used to determine the period during which the squelch cycle is in operation.

FIG. 3 illustrates a modification which has advantages from a cost standpoint. It utilizes ordinary AC or DC electric clock motor as the timing mechanism. The squelch button 1 is shown not as operated directly by hand but instead from a radiant energy receiver unit 54. This receiver is actuated by suitable radiant energy transmission from a remote control transmitter, the radiant energy being of suitable frequency for this receiver, whether in a coded or uncoded form. As the exact schematic diagrams for such receivers are already well known the illustration of it given here is by means of a block diagram. The preferred form of this invention is not concerned with the exact mechanical or electrical connection between the receiver and element of a remote control system, the particular transmitter element that is actuated by the listener at a remote location. In the case of a remote transmission of the control signal by radiant energy, whether by transverse electromagnetic waves or by longitudinal sonic or ultrasonic waves, the actuation is pulse coded of necessity if it operates in a frequency band which is chosen to assure that the squelch button will not be accidentally actuated by any program sounds or incidental signals that come from the radio receiver with which this invention is used.

In FIG. 3 the magnetic relay 4 has its coil 3 normally across the line in such a way that its switch contacts 4A and 4B must be reversed for squelching. The illustration shows the movable blade elements of the relay in solid lines in the squelch position and in dotted lines in the position when output of the receiver is not muted. The relay coil 3 coil is connected to a sliding contact 22 on the clock. When the squelch button 1 is actuated by the radiant energy actuated receiver, a circuit is made through the clock motor 16. This starting circuit starts the pointer 20 moving away from a contact 21 and in so doing breaks the electrical connection for the magnetic relay coil 3. As a result, the relay 3 moves into the position shown in FIG. 3, a position which illustrates the situation shortly after a squelch cycle has been initiated. At the same time it will be noted that switch arm 4B completes the circuit through the clock motor 16 which therefore continues to turn. This is a somewhat different form of the same positive locking function that is set forth in the FIGS. 1 and 2. It will be seen that switch blade 4A is thrown to a position where the signal circuit to the voice coil 7 is interrupted. This arrangement uses the interruption modification ilustrated in FIG. 2 rather than a shunt for squelching. The closing of the contact on switch arm 4B also throws the neon light 17 across the line and causes it to glow. The situation with an opened signal circuit continues as long as the arm 20 is out of contact with the contact 21. In the illustration of FIG. 3 the clock has been set so that the arm makes one r.p.m. In other words, it is set for a squelch cycle of one minute. Changing of gears in the electric clock in a conventional manner permits the selection of any other desired squelch cycle length.

When the arm or pointer 20 has made a full revolution and makes contact with the contact 21, coil 3 of the magnetic relay 4 is once again connected to the line, the relay operates restoring sound and cutting off power from the clock motor 16. In other words the squelch mechanism is now reset for another squelch operation. As the coil of the magnetic relay 4 is normally across the line it is desirable to take the power for the squelch mechanism through the main receiver on and off switch so that the coil 3 will not be across the line when the receiver is not in use.

FIG. 4 illustrates a somewhat different form using only thermal delay relays. These thermal relays are of the same design as in FIG. 1 or at least they have the same number of parts. Accordingly the same reference numerals 9 and 10 for the relay load terminals 15 for the relay contacts points and 14 for the heater winding are used in this figure also. Four thermal delay relays are utilized, 26, 27 and 28 being of the normally open contact type and the fourth relay 29 being of the normally closed type. Since the movable contact points of the latter operate in the opposite direction they are numbered 30 to distinguish from the contact points 15 of the normally open thermal delay relays. Instead of a spring return squelch switch, a DPDT switch 31 is used. Squelching, as will be seen, is effected by interrupting connections to the voice coil 7 instead of by shunting. Such a switch is often referred to as a "push-push" switch. The first push sets it at one position and the next at the opposite. An ordinary toggle switch may of course also be used but this is somewhat less convenient.

When the receiver is first turned on, connections to the voice coil are provided through the normally closed contacts 30 of the thermal delay relay 29. Heater 14 of thermal delay 28 is started, and after its normal time delay its contacts 15 close. This throws the heater 14 of the normally closed thermal delay relay 29 into operation. After sufficient time has passed for relay 29 to operate, the normally closed contacts 30 open and remain open while the receiver is in operation, as the heaters of both 28 and 29 are now across the line and are not affected by the squelch switch.

Since FIG. 4 is intended to show the position of the squelch switch 31, shortly after initiation of a squelch cycle, we must first consider the situation before the squelch switch 31 was actuated and which is shown in the dashed line position of the switch poles 24 and 25. In this position heater 14 of thermal delay relay 27 is across the line and has heated up because we are considering a situation after both 28 and 29 have gone through their heating cycle. At this point therefore, the contacts 15 of thermal delay relay 27 are closed and the circuit through the voice coil is completed through the pole 24 of the switch 31 and the load terminals 9 and 10 and closed contacts 15 of thermal delay relay 27. In other words at this point there is sound coming out of the loud speaker 6.

Now the squelch switch 31 is actuated into the position shown in solid lines in FIG. 4. The result is that the heater 14 of thermal delay relay 27 is disconnected, cools down rapidly and the movable contacts 15 of this relay open. At the same time the movement of the pole 24 has disconnected the voice coil circuit from the load terminal 9 of delay relay 27 and there has been an instantaneous squelch. Now however, in the new position of pole 24, the voice coil is connected to load terminal 9 of thermal delay relay 26. However as the heater of this relay was cold its contacts 15 are open and so the squelch begins. Pole 25 of switch 31, however, has now connected the heater 14 of the thermal delay relay 26 across the line, and this heater begins to heat. Finally, when the period of delay of relay 26 has expired its contacts 15 close, the circuit to the voice coil is once more completed, and the sound resumes. Thereafter, the position of the pole 25 maintains the heater 14 of the relay 26 across the line and through pole 24 the contacts 15 of this relay remain closed to continue the sound output.

Now let us assume that it is desired to initiate another squelch cycle. The squelch switch 31 is thrown to the opposite position. Pole 24 then disconnects the voice coil from load terminal 9 of the relay 26 and connects it to load terminal 9 of relay 27. However, since this relay is cold and its contact points 15 open, the signal circuit is broken and a squelch is effected. At the same time however, pole 25 of switch 31 has now connected heater 14 of relay 27 across the line and this heater begins to heat up. After its delay time its contacts 15 close and the circuit through the voice coil is once more made. The operation of the switch 31 has disconnected the heater 14 of relay 26 so this relay now becomes cold and its contacts 15 open. In other words the position is the same as when the first squelch cycle was indicated. Therefore when the switch 31 is once again operated the cycle starts again as described above.

It will be noted that relays 28 and 29 are only required because otherwise, when the receiver is turned on, both relays 26 and 27 would be cold and open and there would therefore be no sound from the receiver until one or the other of these relays had gone through its delay cycle depending on the position of the switch 31. Normally however it is desired to have a receiver start operating at once, and so the two additional relays 28 and 29 are provided for this purpose. Since there is always at least one heater connected across the line, the modification of FIG. 4 preferably receives is power supply through the main on and off switch for the receiver for the same reason as set out above in connection with the description of FIG. 3. To arrange for a shunt instead of a break of the sound circuit during squelch cycles the movable terminals 15 of these thermal relays are reversed to the normally closed positions.

Figure 5:
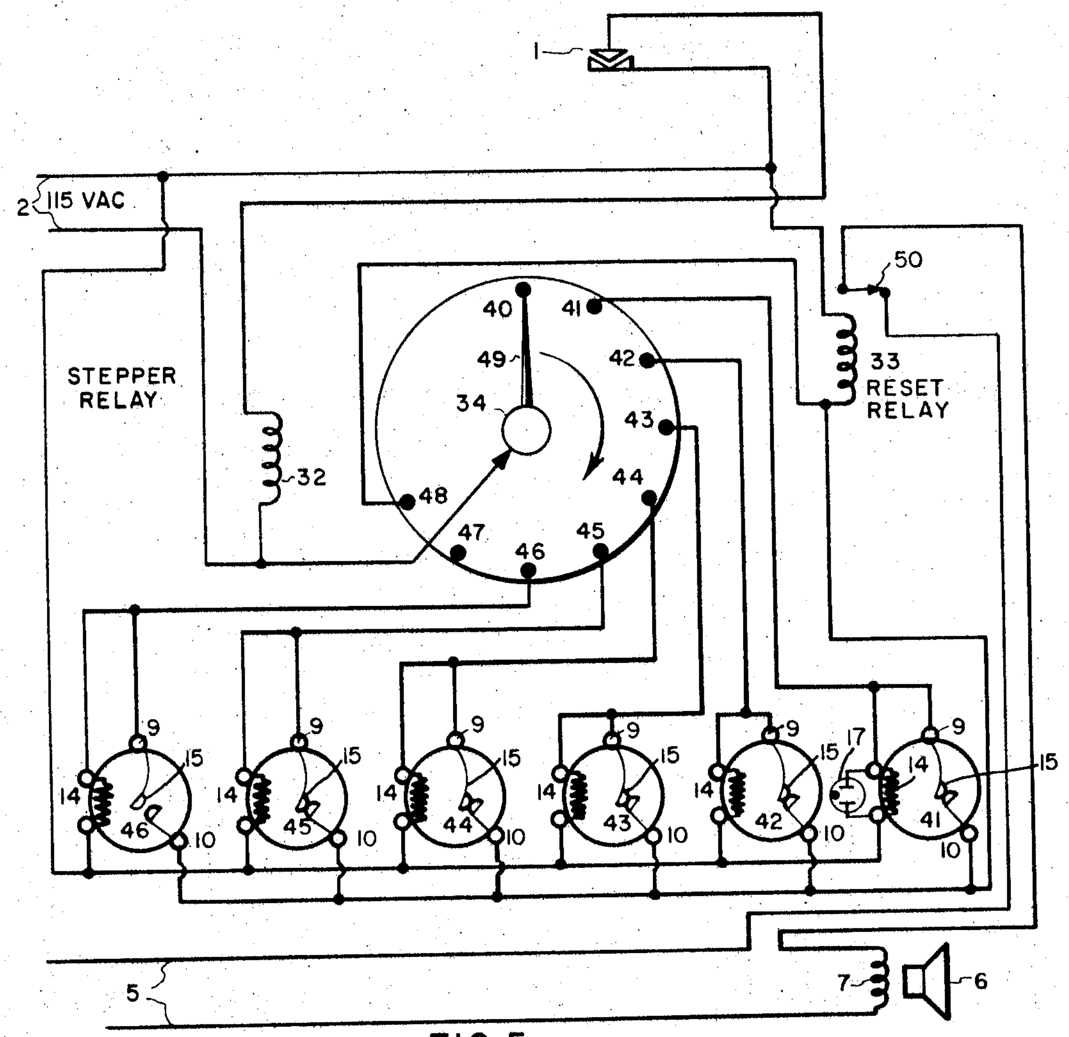
FIG. 5 is a time delay selection by successive squelch switch actuations.

The figures which have been described above and particularly FIG. 3 are relatively cheap and simple and for a great many purposes constitute preferred modifications where internal wiring changes in the receiver are not objectionable. However, sometimes it is desired to provide a choice of squelch cycle time by means of the squelch switch itself. This arrangement is a more expensive modification, but where it is deemed worthwhile is included in the invention. One typical example of such a device using thermal time delays is shown in FIG. 5. A series of six thermal delay relays 41 to 46 are provided with increasing delay times up to a maximum of three minutes. The relays are of the same type of normally open circuit relay as described in some of the foregoing figures and the same individual part numbers of load terminals 9 and 10 movable contacts 15 and heater 14 are used. There is also provided a conventional step operated switch 34 with nine positions from the inactive position 40 to position 48. Positions 41 to 46 bear the same numbers as the corresponding thermal delay relay and each of these positions connects to load terminal 9 and to one end of the heater 14 of the respective relay. The other ends of the heaters are connected together to one side of the power line 2 while the load terminals 10 are also connected to a reset relay 33 which will be described below. The step switch 34 is actuated by a stepping coil 32 which is connected across the line by the squelch switch 1. This step arrangement is made possible by having one end of the stepping coil permanently connected to one side of the line and the other end connected to the other side through the squelch switch. The end of the coil 32 connected permanently to the line is also connected to the movable switch arm 49 of the switch 34. There also is provided a switch 50 connected in series with the voice coil 7, which switch is actuated either by the stepping coil 32 to open the switch or by the reset relay coil 33 to close the switch. The figure shows the position before any squelch is initiated, in other words, the position in which the switch 50 is closed.

Let us now assume that the listener wishes to initiate a very short squelch cycle, for example 15 or 20 seconds, corresponding to the delay for relay 41. This is done by a single actuation of the switch 1 which causes the stepping coil 32 to open the switch 50 and to move the arm 49 to the contact 41 for the correspondingly numbered delay relay. The stepping coil 32 opens the switch 50 so that the squelch starts immediately and the heater 14 of delay relay 41 is connected across the line and beings to heat. Finally after the expiration of the time for which this relay is designed the normally open contacts 15 close and current flows through load terminal 9, contacts 15 and load terminal 10 to the coil 33 of the reset relay. This reset relay performs two functions. First it moves the arm 49 back to the original contact position 40 and secondly it closes the switch 50. Heater 14 of delay relay 41, of course, is also disconnected and cools off. In a conventional stepping switch with reset relay, the coils 32 and 33 are physically located in the switch body. FIG. 5 however is a diagrammatic schematic of the electrical circuits and so for clarity the two coils are shown separated from the switch body.

Now let us suppose that the listener wishes to initiate a longer squelch period corresponding to one of the other thermal relays 42, 43, 44, 45 or 46. This can be done by the corresponding number of momentary actuations of the squelch switch 1. For example, if a delay of 2½ minutes is desired, which might correspond to delay relay 45, the squelch button would be depressed five times. The heater of relay 45 is thus connected in circuit and of course the switch 50 is opened by the first of the pulses through the stepping coil 32. The operation proceeds exactly as described in connection with a shorter period of relay 41.

If the listener presses the squelch button twice more to position 47 the switch 50 remains permanently open because there is no delay relay current to actuate reset coil 33. This position might be chosen, for example, in the case of television where there is a very long commercial and the viewer merely wishes to cut off the sound but does not know how long the commercial is going to be. The next actuation of the squelch button 1 moves the arm 49 to the contact position 48 which energizes the coil 33 of the reset relay, connects the voice coil of the speaker and resets the arm 49 to its original position.

It should be noted that it is not necessary for the listener to decide ahead of time what length of squelch cycle he wishes. For example, he might think that delay relay 44 would be sufficient and press the button four times. Then he might change his mind and decide that he really wanted a longer one, namely one corresponding to delay relay 46 and so would press two more times. Of course these operations are additive. Thus for example if relay 44 ran for two minutes the last two actuations could occur shortly before the two minutes were up and this would then result in the total time of nearly five minutes because the delay relay 46 always operates for its full time regardless of when it is cut into circuit. This cumulative feature presents no problem, because if the listener then decides he wants to hear sound sooner he may press the button twice more bringing the arm 49 to position 48, thereby restoring the sound output and resetting everything. Pilot light 17 can be provided across the heaters 14. One only of these is shown in FIG. 5, across the heater 14 of delay relay 41, in order not to confuse the drawing.

Figure 6:
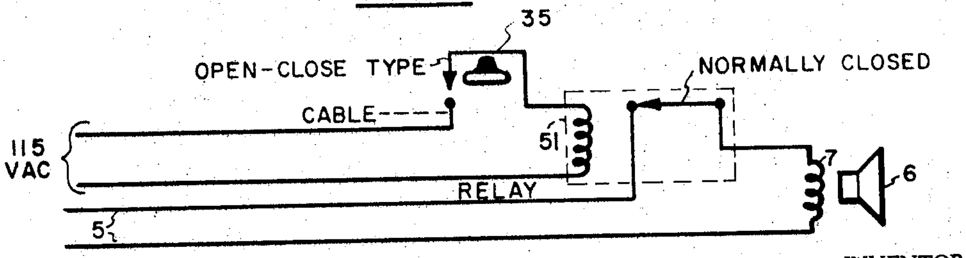
FIG. 6 is a schematic of a pneumatic delay modification.

FIG. 6 illustrates the use of a pneumatic delay. Here the squelch button 35 is of the pneumatic type. It is pressed down closing one circuit and gradually resumes its original position as air leaks through a small orifice determining the time delay. Actuation is by a single relay 51 which opens the circuit to the voice coil 7.

Figure 7:
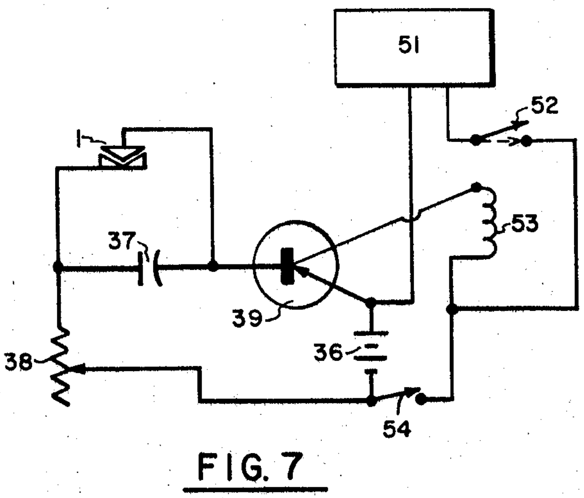
FIG. 7 is a schematic of an RC time delay modification using a transistor.

FIG. 7 illustrates a different type of relay which is useful, for example, with transistor receivers such as portable radios. Such a receiver is diagrammatically shown at 51 as provided with the power supply 36, which may be of a conventional battery type. Connection to the receiver is through a switch 52, which is normally closed as shown by the dashed position of the switch arm. The drawing is intended to show the situation just after a squelch cycle is initiated as will be described below. A transistor 39 has its collector connected to a coil 53 of the switch 52. The other end of the coil connects to the battery 36. The base of the transistor leads to a capacitor 37 and then in series through an adjustable high resistance 38 back to the power supply 36, the other end of which is connected to the emitter of the transistor. Squelch switch button 1 is connected across the capacitor 37.

When a squelch cycle is to be initiated the button 1 is momentarily depressed, discharging the capacitor 37. Now current flows from the battery through resistance 38 gradually charging up capacitor 37. This current between the emitter and the base turns on the transistor and is amplified, thereby producing a much stronger current from the collector through the coil 53 of the switch 51 back to the emitter of the transistor. This current will continue to flow as long as there is a certain minimum base current in the transistor. As the capacitor 37 charges, the base current decreases until it reaches a point where the transistor no longer conducts. Current ceases through the coil 53 and the switch 52 is closed starting the transistor receiver operating again. The power supply, and if necssary, the transistor 39 or capacitor 37 or both may be incorporated into the transistor receiver. Preferably the power to the transistor 39 goes through the main on and off switch 54 for the receiver. It will be noted that it is not necessary to introduce a switch in the voice coil circuit of the loud speaker because the transistor receiver starts instantly. The variable resistor 38 can be adjacent to the button 1 so that the listener can readily change the duration of the squelch cycle if he so desires. If a single fixed delay is satisfactory the resistor 38 can be set to a particular value or replaced by a fixed resistor of the proper value and all of these elements may be incorporated into the receiver itself, with only the push button 1 on a cable extending out to the position where the listener desires to operate the squelch cycle.

FIGS. 6 and 7 represent operative devices, but the time delays set out have disadvantages in practical operation and are, therefore, not preferred. For example, FIG. 6 has pneumatic element which can become clogged with dust or dirt and FIG. 7 requires an electrical circuit with a very large time constant for a timer of this type and is, therefore, not desirable for any but quite short squelch intervals. The positive mechanical locking arrangement that is made possible by relays or clock timers which are much more durable and reliable for long term use, and can be employed as an economical construction with squelch intervals of relatively longer duration. The electric clock mechanism is particularly desirable and is a very cheap and reliable device for timing purposes.

It has been pointed out above that preferably the squelch switch is actuated by the listener from a distance, but in many cases the receiver for a remote radiant energy actuation pulse requires a power source. This can be a self-contained battery. If the remote control receiver is designed into a radio or TV receiver unit from the start, it may plug into or otherwise connect with and utilize the power supply of the radio or TV receiver unit.

FIGS. 1 to 7 illustrate a number of different modifications of time delay elements and positively locking relays of the preferred form. It should be understood that these illustrate various combinations and that the same elements can be used in different combination. For example, in FIG. 5 the stepping switch is associated with thermal delay relays, but other types of delay relays, such as the cheap and reliable clock relay illustrated for example in FIGS. 2 and 3 may be used. Essentially, it should be noted that the present invention utilizes a combination of momentary switch actuation with delay mechanisms which determine squelch cycle length and which lock positively for the periods in question. This general characteristic of the invention is applicable also to the modifications shown in FIGS. 8 to 15, which will now be described and which for many purposes constitute preferred modifications as they can be attached to existing receivers without requiring any electrical changes in the receiver or without requiring any knowledge of electricity or electronics. For simplicity the squelch actuating switch is omitted from the modifications shown in FIGS. 8 to 15 as it is no different than in the other modifications. In order not to confuse the drawings it is, therefore, emitted in these figures, although it should be understood that a squelch switch must be present.

Figure 8:
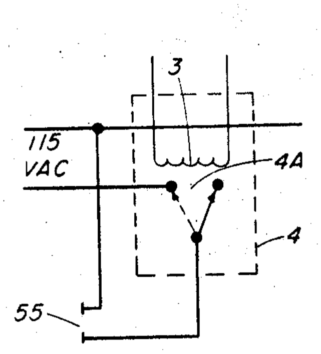
FIG. 8 is a schematic similar to FIG. 3 but turning off power to the receiver during the squelch interval.

FIG. 8 utilizes the locking relay mechanism of FIG. 3, but instead of the blades of relay portion 4A connecting and disconnecting the voice coil of a loudspeaker, they connect or disconnect the AC line from a conventional socket 55.

In operation the mechanism is connected to the AC supply 2 and a receiver that starts immediately, for example a transistor radio is plugged into the socket 55. This arrangement requires no change in the receiver, and electrical knowledge on the part of the user when he installs it. Furthermore this form of the mechanism to squelch commercials can easily be placed at a convenient spot so long as there is an adequate length of power cord for the receiver to plug into the socket 55. This feature lends a desirable feature of flexibility in the ways that the invention can be connected and used.

When the squelch button 1 is actuated from the remote control transmitter through the receiver 54, the clock starts just as is described in conjunction with FIG. 3, the neon light 17 lights up to show that squelching or muting effect is taking place, and the power supply to the radio or TV set is shut off. The radio therefore stops during the squelch interval. When the clock has made its revolution, as illustrated for a squelch interval of one minute, the magnetic relay unlatches, blade 4A moves over to the normal operating position as shown in dashed lines, and the receiver starts playing again and continues to play until another squelch cycle is initiated.

With receivers, such as most television receivers, which are provided with vacuum tubes, the very simple device shown in FIG. 8 is less suitable, because when the squelch interval is over it takes an appreciable time for the tube heaters to heat up again and, therefore, at the end of the interval the receiver does not start palying immediately and it may take ten seconds or more for the tubes to warm up. For some purposes this can perhaps be tolerated, even though it is undesirable to turn electronic tubes on and off too often, the warm-up period being considered simply as a part of the squelch interval. However, if a shorter squelch interval is desired and the mechanism is reset before the squelch interval has completed, as is shown in connection with some of the preceding figures, there will then be a period of silence which can be quite disturbing psychologically.

Figure 9:
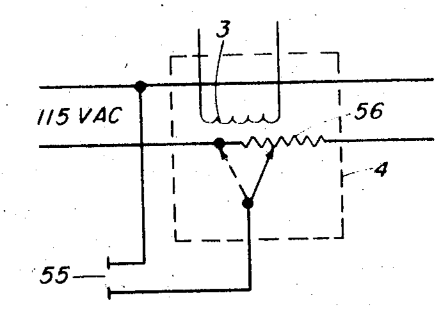
FIG. 9 is a similar schematic lowering power voltage during the squelch interval.

FIG. 9 illustrates a modification which minimizes or practically elimintaes an undesirably long warm-up period. The essential circuit is quite similar, but when the squelch is initiated, instead of cutting off power entirely a variable resistor 56 is cut in series with the socket 55. This reduces the voltage sufficiently so that sound can be muted to a point where the commercial is no longer disagreeable. On the other hand, a considerable proportion of the power continues to go through the heaters of the tubes and they do not cool off to a serious extent, as is the case with the simpler modification shown in FIG. 8. Now when the time delay has restored power, sound begins after little or no delay interval. If the modification of FIG. 9 is used, it is not possible to eliminate the sound from commercials completely, as is the case in FIG. 8, because otherwise insufficient current would flow through the heaters and the tubes would cool down to the point where a relatively longer warm-up would be needed. However, in many cases a considerable muting of the sound of the commercial is all that is required by the user. The particular value of the resistor 56 is that it can either be pre-set for a particular receiver or it may be adjusted initially by the user until sufficient muting results without excessive cooling down of the tubes. This is still external to the receiver itself and requires no electrical knowledge on the part of the user at all. If provisions are made for the user to vary the resistance 56, the design should preferably be in the form of a screwdriver slot or similar mechanism rather than a knob which could be turned by children or other people that wanted to experiment and could not resist seeing what would happen if the knob is turned. This is a very similar situation to many controls on television sets which are intended only to be operated by a service man or by a user who has extensive electronic knowledge.

Another type of operation that can produce a muting effect without involving any electrical changes in the receiver itself is illustrated in various forms in FIGS. 10 to 15 and operates muting by turning down the volume control temporarily from normal operating position to a position providing a sufficient muting effect.

Figure 10A:
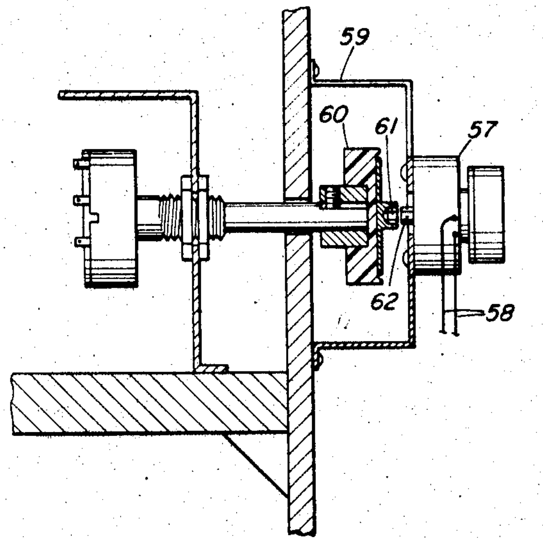
FIGS. 10A and 10B are cross-sections through a volume control along the line 10—10 of FIG. 11, 10A showing the control in normal operating position and 10B during a squelch interval.
Figure 11:
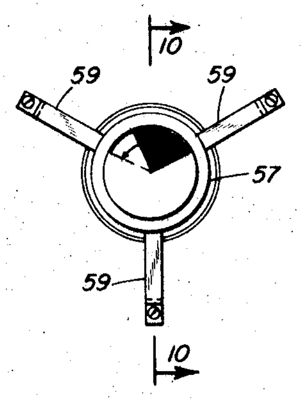
FIG. 11 is a plan view of the end of a rotary solenoid showing operative rotational limits.
Figure 10B:
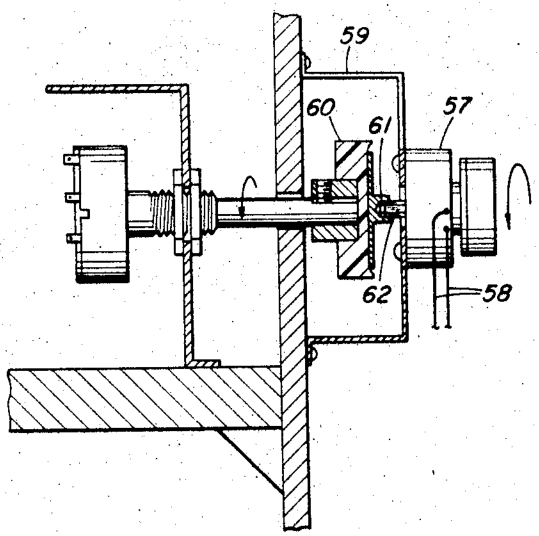

FIGS. 10A and 10B and FIG. 11 show a rotary solenoid 57 of conventional design. This is actuated from the locking relay or mechanism of the squelch circuit and so is diagrammatically shown simply as the two actuating wires 58. A small electric torque motor with a spring loaded stop is in effect a rotary solenoid, and the term rotary solenoid is used with this relationship in mind. The electric motor has an armature that aligns itself magnetically, when actuated, to engage a clutch facing at the end of the armature shaft, and then falls away when the motor is turned off.

A new volume control knob 6 is placed on the volume control shaft to provide a clutch facing for the solenoid, and the solenoid itself is fastened onto the panel of the receiver through three legs 59. It will be noted that the knob has a depression with a high friction coefficient or rough surface which serves as a clutch or gear facing 61 into which the shaft 62 of the rotary solenoid fits. When the solenoid is not actuated, the shaft is not mechanically engaged in this depression, as is shown in FIG. 10A. However, as soon as the solenoid shaft starts to turn, this shaft also moves forward slightly to a position shown in FIG. 10B, the end of the shaft being illustrated at 62;

and now as the solenoid turns, it turns the volume control counterclockwise, as is shown by the arrow in FIG. 10B. The amount of movement of the shaft is very small from complete disengagement to engagement, and this amount of movement has been greatly exaggerated in FIGS. 10A and 10B clarity. When the solenoid is in the position of FIG. 10A, showing the normal operating position for the receiver, the volume control knob 60 is turned freely with the fingers in the normal manner. That is, the volume can be controlled, and the ON and OFF switch can be actuated in the usual way. However when the set as been turned on and is operating at a normal sound level, and then a squelch cycle is started as has been described above in connection with the other figures, the volume control is turned in a counterclockwise direction sufficiently to mute the sound to the desired degree. Often this amount of turning movement will by no means be the full range of the control knob's travel.

The rotary solenoid has to turn a sufficient amount to produce a muting effect even when the volume control has been set for fairly high volume, and therefore if the squelch cycle is actuated when the volume control is almost turned off, it would tend to turn the volume control against the conventional mechanical stop or might even turn it further, which would cut off power from the receiver. This is usually what happens when a volume control knob is turned beyond its lowest setting. However, the power switch turn off movement of the volume control knob requires an amount of force that is greater than that which is needed to turn the volume control during its normal volume controlling range. Thus there is no problem of a complete shut off of power, because the projection 62 is made so it will slip or give by spring action. It does not grip the volume control knob strongly enough to turn it against the greater resistance it encounters when the volume knob is turned all the way to the low end. The rotary solenoid merely causes the shaft projection 62 to slip or give a little.

It will be noted that except for the special situation where the volume that was squelched was already almost all the way off, as has just been described, the amount of the anticlockwise movement of the volume control knob does not completely cut off the sound output. Furthermore when the rotary solenoid snaps back to its normal or rest position, the receiver output is restored to the volume output level that was originally set by the volume control shaft during its normal operation. If the volume control shaft happens to be turned practically all the way off when the solenoid is actuated the aforementioned slip of the shaft projection 62 occurs over part of the way and then when the solenoid turns back to its rest position the volume setting is restored to a somewhat higher level. This is not a useful action, but it represents a situation that practically never occurs in normal use, and therefore the rotary slip or give provision for protection against damaging of equipment by trying to force a volume control too far is a safety feature that is provided without any significant inconvenience.

Figure 13:
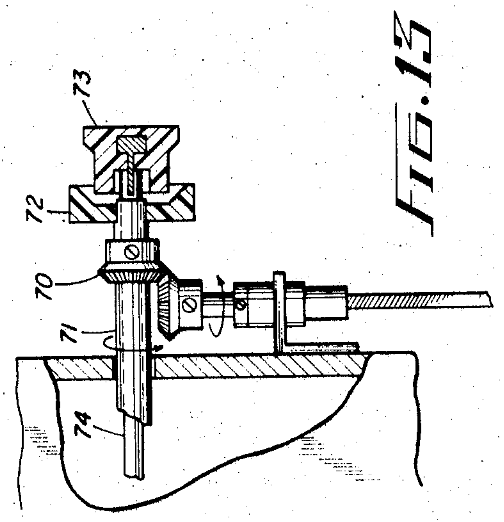
FIG. 13 is a detail of a dual television control that can be operated by the flexible cable.
Figure 12:
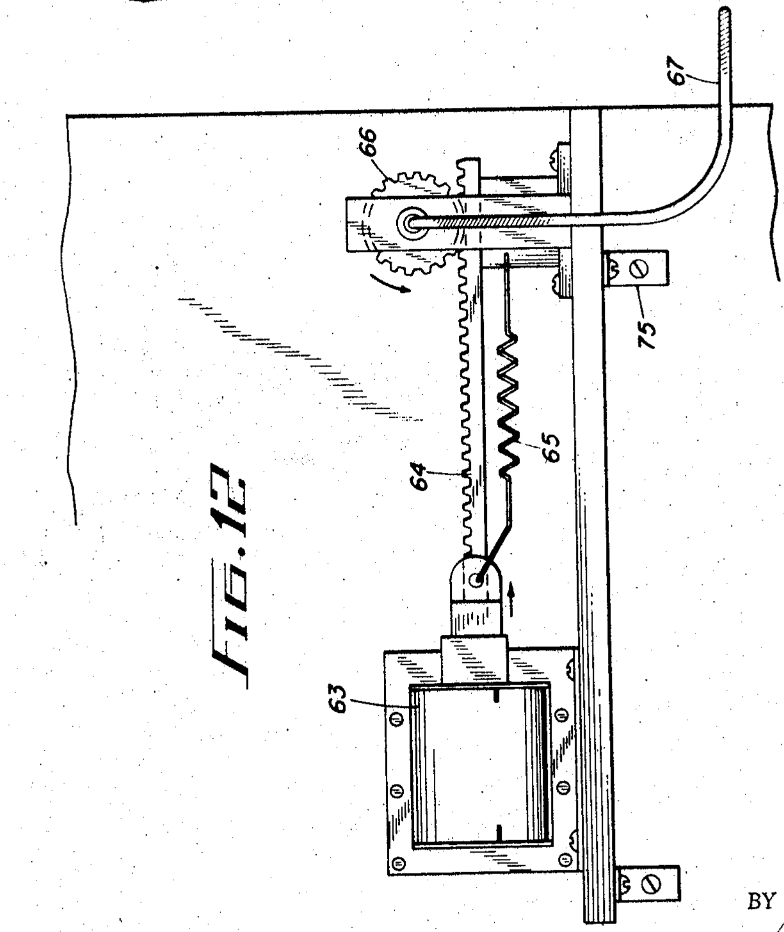
FIG. 12 is an elevation of the rear of a television receiver with a solenoid that works a rack and pinion gear and flexible cable.
Figure 14:
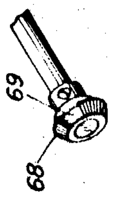
FIG. 14 is an enlarged isometric of one bevel gear of FIG. 13.

The rotary solenoid becomes temporarily attached by a gear or friction clutch to a volume control shaft and is held by at least one leg radio or TV panel. In some situations it may be inconvenient to have all of this assembly out in front. FIGS. 12 and 13 show a modification which is useful with any receiver which either has a separate volume control shaft or has the volume control turned by the sleeve of a coaxial double control. Essentially the modification to be described next provides an ordinary solenoid of the linear action type 63 which moves a rack 64 against the pull of a spring 65. The rack turns a pinion 66 on the end of a flexible cable 67. The other end of this flexible cable terminates in a bevel gear 68, which, as can be seen in FIG. 14, has a section 69 in which there are no teeth. This bevel gear, in the portions where there are teeth, meshes with another bevel gear 70, shown in FIG. 13, attached to the sleeve 71 of a dual control. The volume control connection or knob in this case turns the sleeve and is shown at 72. The other control 73 turns a shaft 74 and performs its function in the usual manner, which is of course no part of the present invention.

When the linear solenoid 63 is mounted on the back of a television receiver or elsewhere on the housing with suitable brackets 75, or by spring clamps. The back of a TV receiver is often made of hard board. This mounting job is easily done with a cement or other conventional means even by the user who is without the electrical knowledge he would need to connect in wires. In the retracted position, which is shown in FIG. 12, the bevel gears 70 and 68 will have turned the volume control sleeve 71 for the full counterclockwise distance corresponding to a suitable muting effect. As soon as the squelch cycle has been completed, the solenoid 63 is deactivated and the spring 65 pulls the rack forward, turning the bevel gear 68 until the toothless portion 69 is opposite the bevel gear 70. Now the knob 72 can be turned without the gears meshing and set manually to any particular volume which is normally desired for the receiver.

The modifications shown in FIGS. 12 to 13 will conveniently cause a greater movement of the volume control than is readily achieved with rotary solenoids shown in FIGS. 10A, 10B and 11. Therefore, a greater degree of muting effect is possible, a feature which for some purposes is a desirable one. This advantage is obtained, however, at the expense of some additional complication, as more elements are involved. The protection against turning the volume control too far if it was almost all off when the squelch cycle started results quite simply from the fact that the flexible shaft 67 if turned against too great a resistance tends to twist somewhat and so to protect against damage. Alternatively, a simple conventional slipping clutch (not shown), may be used which has sufficient grip to turn the volume control but not enough of a grip to turn it through an ON and OFF position.

Figure 15:
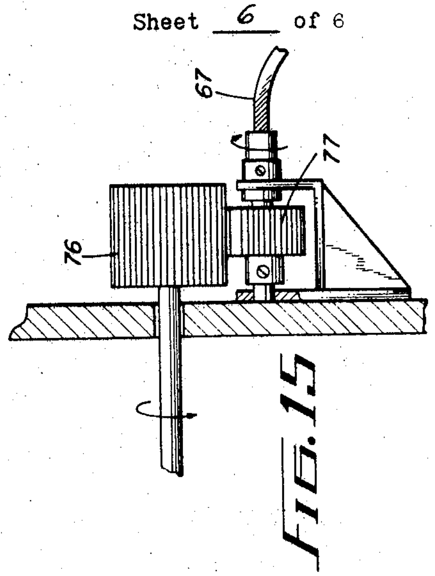
FIG. 15, is a detail of a modified knob and gear actuator.

The modification shown in FIGURES 12 to 14 is not readily applicable to multiple television receiver controls in which the volume control is the shaft and not the sleeve. Unfortunately, this is the case with many television receivers, and it is quite difficult, although not impossible, to have the bevel gears attached in front of the knob 73. No problem, of course, is presented with the rotary solenoid modification of FIGS. 10A, 10B and 11 as this operates on a knob which is on a shaft. However, the rotary solenoid modification can be a rather large replacement for the original volume control knob and it does not always provide as easily for a very large movement of the volume control knob as is possible with a straight solenoid rack and pinion drive, as shown in FIGS. 12 to 14. FIG. 15 illustrates a simple modification which permits operation with a volume control knob on a shaft. In this case the volume control knob has corrugations which are in effect spur gear teeth and is shown at 76. The end of the flexible shaft 67 turns another spur pinion 77 which, as is shown in FIG. 15, has a portion of its periphery devoid of teeth. FIG. 15 shows the gear in this position, in other words, in the position in which there is no squelch cycle, and now of course the knob 76 can be turned manually to any degree desired. As soon as a squelch cycle is initiated, the gear 77 turns and the teeth begin to mesh with those on the knob 76 and muting is effected in the same manner as was described in conjunction with the bevel gears of FIGS. 12 to 14. FIG. 15 shows a single volume control shaft; but of course in a double control where the volume is on the inner shaft, this modification operates with the same effectiveness. Slipping clutch protection of excessive strain if a squelch cycle is initiated when the volume control was turned almost off will protect in the same manner as described in conjunction with FIGS. 12 to 14.

In the description of the figures positive locking relays have been described in which the positive lock is effected by the movement of a mechanical element such as a switch blade. There are also relays which provide positive locking in which the locking is electrical. For example a silicon control switch or, where the nature of the controlled current is suitable, a silicon controlled rectifier. The relay or switch is activated by an electrical pulse. Once activated the switch or relay remains locked positively until a voltage of the proper polarity is applied at the end of the delay which determines the squelch cycle is applied to the silicon controlled switch or rectifier, which resets it to the initial conditions before the squelch cycle started. In the claims the reference to positive locking is not to be considered as limited to a locking means in which there is an actual movement to a mechanical element.

I claim:

1. In combination with an electromagnetic radiation receiver having at least an audio output, means for muting said audio output for at least one predetermined period of time, comprising in combination, (a) listener actuated, momentary switching means to initiate the muting effect, (b) said switching means being provided with positive locking means including at least one mechanical element during a predetermined squelch cycle after the momentary switching means is released, time delay means started by said momentary switch actuation and maintained by said positive locking means and means actuated by the end of said time delay for unlocking said locking means and resetting the muting and time delay means to a condition for repeating the muting cycle on actuation of the momentary switching means, whereby at the expiration of the time delay the audio output is restored to normal volume.

2. A combination according to claim 1 including listener-actuated means for defeating the muting and resetting the locking means.

3. A combination according to claim 1 in which the locking means comprises a magnetic locking relay.

4. A combination according to claim 3 in which the locking relay is of the multiple pole type, one pole for the muting effect and the other to lock in the relay during the squelch cycle.

5. In combination with an electromagnetic radiation receiver having at least an audio output, volume control means for controlling the volume of the audio output, and means for muting said audio output for at least one predetermined period of time, comprising in combination (a) the muting means comprising means to turn the volume control through a predetermined arc sufficient to mute the audio output, (b) listener-actuated, momentary switching means to initiate a muting effect by actuating the muting means, (c) said switching means being provided with positive locking means after the momentary switching means is released, time delay means started by said momentary switch actuation and maintained by said positive locking means during a predetermined squelch cycle, means actuated by the end of said time delay for unlocking said locking means, resetting the volume control to its initial position and resetting the muting and time delay means to a condition for repeating the muting cycle on actuation of the momentary switching means, whereby at the expiration of the time delay the audio output is restored to the volume prior to the turning of the volume control through a predetermined arc.

6. A device according to claim 5 in which the means for turning the volume control comprises a rotary solenoid positioned so that it engages the volume control knob at the start of its turning.

7. A device according to claim 5 in which the means for actuating the volume control comprises a solenoid, a flexible drive connection actuated by the solenoid, said drive connection cooperating with drive connections on the volume control during actuation, said means having a point of disengagement from the volume control at the end of the muting cycle.

8. A device according to claim 7 in which the drive means comprises a pair of bevel gears, one connected to the volume control means and provided with teeth around its full periphery and the other actuated by the solenoid having a portion devoid of teeth whereby when the portion devoid of teeth is aligned with the bevel gear on the volume control the latter can be turned without the gears meshing.

9. A device according to claim 8 in which the volume control knob has an external surface in the form of corrugations constituting a spur gear and the means actuated by the solenoid comprising a spur gear with a portion devoid of teeth positioned so that the portion with teeth meshes with the teeth on the volume control knob and at the start and end of a muting cycle the portion devoid of teeth is aligned with the volume control knob so that in this position the volume control knob can be turned without turning the spur gear.

10. In combination with an electromagnetic radiation receiver having an audio output and means for muting said audio output, the improvement which comprises in combination, (a) listener-actuated, momentary switching means for initiating said muting means, said switching means including a locking relay which remains locked after actuation, (b) the relay being of the multiple-pole type, one pole effecting muting and the other locking the relay during the muting cycle, (c) a plurality of time delay mechanisms of different delay times and means for successively connecting them by repeated momentary actuations of the listener-actuated switch, and (d) means actuated by the said time delay mechanisms for defeating the sound muting means and resetting time mechanisms to a condition for repeating the muting cycle on actuation of the switching means.

11. A combination according to claim 10 in which the plurality of time delay mechanisms comprise a step actuated switch having a plurality of contacts, the step actuated switch being moved stepwise by successive momentary actuations of the listener-actuated switch, a plurality of thermal time delay relays, each relay being connected to a particular contact of the step switch.

References Cited

UNITED STATES PATENTS

| | | | |
|---|---|---|---|
| 2,520,732 | 8/1950 | McDonald | 178—6 |
| 3,294,901 | 12/1966 | Stanghi | 178—6 |

OTHER REFERENCES

"Commercial Killer Improves Programs," p. 44, Radio-Electronics, June, 1950.

ROBERT L. GRIFFIN, *Primary Examiner.*

R. L. RICHARDSON, *Assistant Examiner.*

U.S. Cl. X.R.

178—6; 307—141.4; 317—141; 325—395, 392